Sept. 4, 1951     H. F. FLOWERS     2,566,881
WHEEL MOUNTING FOR AXLELESS TRUCKS
Filed Nov. 5, 1946     2 Sheets-Sheet 1
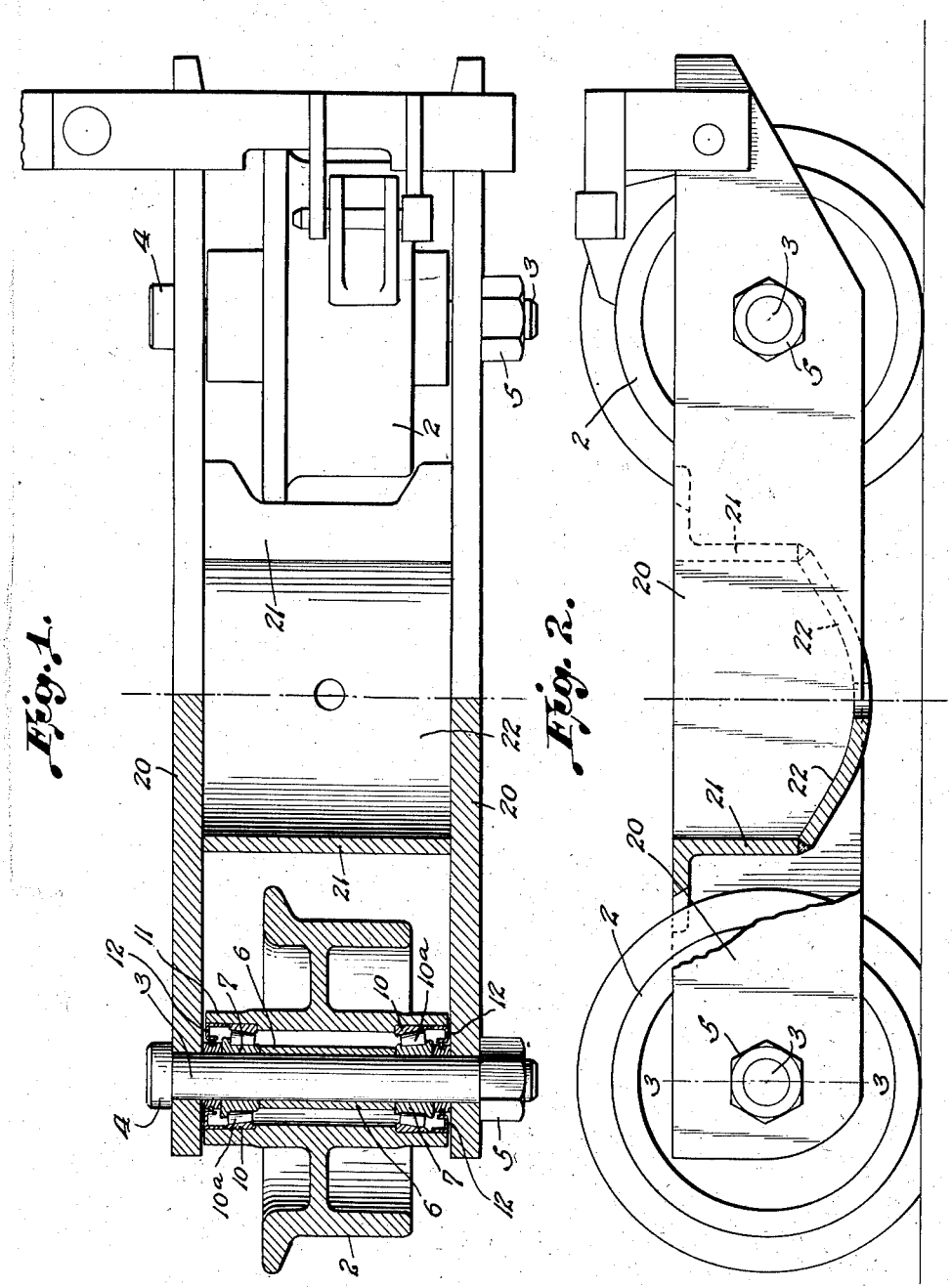
Inventor.
Henry Fort Flowers
By.
Mason, Porter, Diller & Stewart
Attorneys.

Sept. 4, 1951 — H. F. FLOWERS — 2,566,881
WHEEL MOUNTING FOR AXLELESS TRUCKS
Filed Nov. 5, 1946 — 2 Sheets-Sheet 2
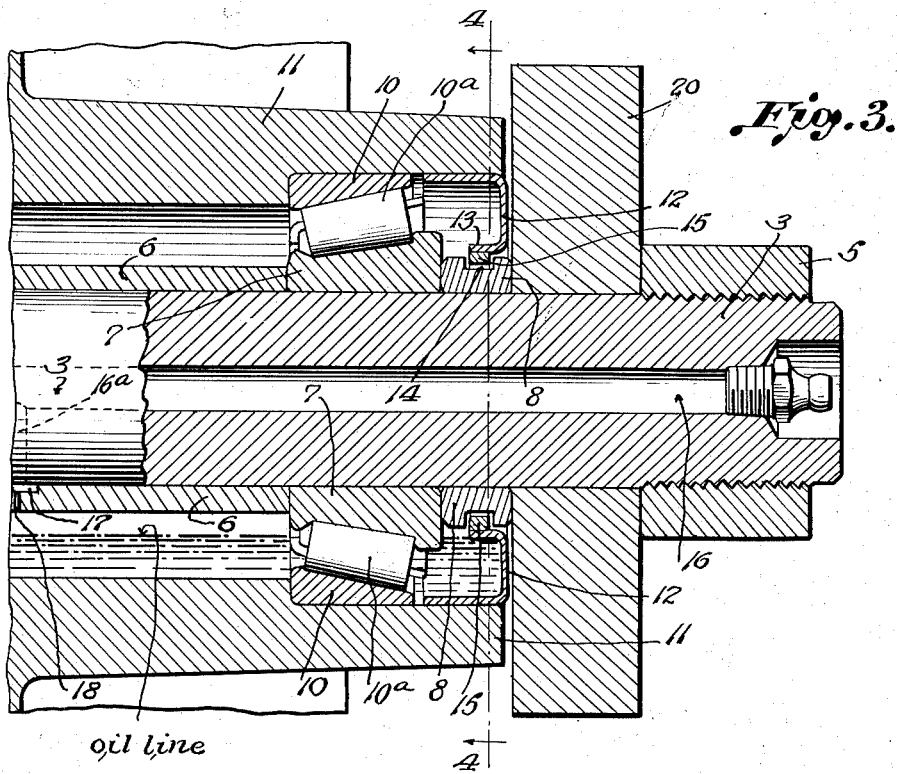
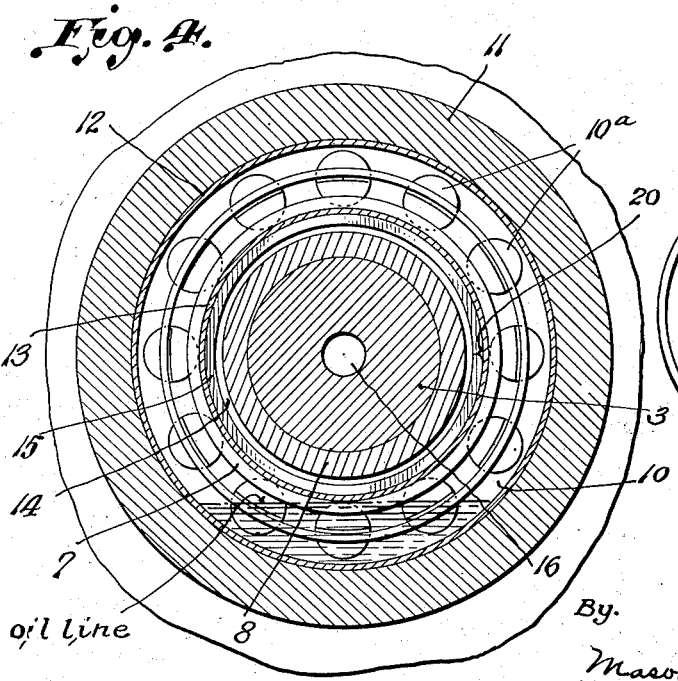
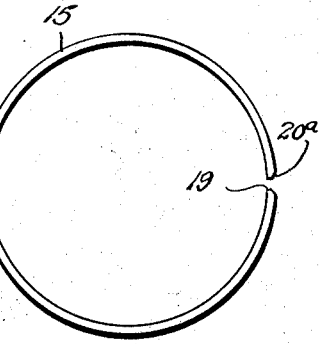
Inventor.
Henry Fort Flowers
By Mason, Porter, Diller & Stewart
Attorneys.

Patented Sept. 4, 1951

2,566,881

UNITED STATES PATENT OFFICE 2,566,881

WHEEL MOUNTING FOR AXLELESS TRUCKS

Henry Fort Flowers, Findlay, Ohio

Application November 5, 1946, Serial No. 707,821

1 Claim. (Cl. 308—187.1)

The invention relates to new and useful improvements in a wheel mounting for axleless trucks and more particularly a wheel mounting which is constructed so as to provide an efficient lubrication for the bearings for the wheel.

An object of the invention is to provide a wheel mounting for an axleless truck wherein a quantity of lubricant may be retained within the hub of each wheel for lubricating the bearings for the wheel.

A further object of the invention is to provide a wheel mounting of the above type wherein the lubricant is retained within the wheel hub by retaining members mounted in the hub at each end thereof, which retaining members have a running fit with the spacer sleeves between the bearings and the side members of the truck frame.

A still further object of the invention is to provide a wheel mounting of the above type wherein the running fit between the retaining members and the spacer sleeves is disposed radially within the bearing surface of the inner race, thus permitting a bath of lubricating oil to be maintained within the wheel hub into which the moving parts of the bearings dip at each rotation of the wheel.

A still further object of the invention is to provide a wheel mounting of the above type wherein an oil retainer is mounted within each outer end of the hub for rotation therewith, a snap ring is frictionally carried by each oil retainer and rotates therewith and wherein each outer spacing sleeve is provided with a groove into which the snap ring associated therewith extends with an oil sealed running fit.

Another object of the invention is to provide a wheel mounting of the above type for an axleless truck wherein the hub of the wheel is so dimensioned as to make a close running fit with the side members of the truck frame so as to prevent dust from entering the hub of the wheel.

These and other objects will in part be obvious and will in part be hereinafter more fully disclosed.

In the drawings which show by way of illustration one embodiment of the invention:

Figure 1 is a view partly in plan and partly in horizontal section through one of the wheel mountings showing an axleless truck embodying the improvements, the gimbal support for the body of the vehicle being omitted;

Figure 2 is a view showing the wheel truck partly in side elevation and partly in section on the line 2—2 of Figure 1;

Figure 3 is an enlarged vertical sectional view through one of the side members of the truck frame and one end of the wheel mounting, said view being taken on the line 3—3 of Figure 2;

Figure 4 is a sectional view on the line 4—4 of Figure 3; and

Figure 5 is an enlarged view of the end portions of the snap ring.

In my prior Patent No. 2,461,263, granted February 8, 1949, there is shown an axleless wheel truck for a rail vehicle wherein the wheels are mounted between spaced side members and in tandem. The present invention has to do with the wheel mounting for an axleless truck such as shown in the aforesaid patent.

The axleless truck includes spaced side members 20, 20 and the wheels 2, 2 are mounted between these side members. These side members are formed from heavy plates. They are connected by transverse angle plates 21, 21 and semi-cylindrical gimbal supporting plates 22, 22. These plates are welded together and to the side plates, thus forming a very rigid wheel frame. There are spindles 3, 3 extending through the side members on which the wheels are mounted. Each spindle is provided with a head 4 at one end thereof and has threaded onto the other end a nut 5. Mounted in the center portion of the spindle is a spacing sleeve 6. At the ends of the spacing sleeve are the bearings for the wheel. Each bearing has an inner race member 7. Also mounted on the spindle 3 outside of each inner race member 7 is an outer spacing sleeve 8. These spacing sleeves 8, 8, the inner races 7, 7 and the center spacing sleeve 6 form a rigid unit against which the side frame members are clamped when the nut is threaded onto the spindle.

Associated with the inner races 7, 7 are outer races 10, 10, between which races are tapered rollers 10ª, 10ª of the usual construction. These outer races 10, 10 are in the hub 11 of the wheel 2. The hub is so dimensioned that it extends from one side frame member 20 to the other side frame member 20 with a close running fit between the end of the hub and the side member with which it is associated. This prevents dust from entering into the hub.

A cup shaped oil seal retainer 12 is mounted in each end of the hub of the wheel outside of the outer race of each bearing. This oil retainer 12 has an outer wall substantially flush with the end of the hub and likewise making a running fit with the side member with which it is associated. It also has an outer cylindrical flange fitting tightly within the hub so that the retainer rotates with the hub. It is also provided with an inner flange 13 which is dimensioned so as to be radially spaced from the outer face of the spacer sleeve 8 with which it is associated. This spacer sleeve 8 is provided with an annular groove 14 in the outer face thereof and a snap ring 15 frictionally carried by the flange 13 of the oil retaner 12 is so disposed relative to the groove as to fit therein with a running fit, that is the snap ring does not contact with any of the walls of the groove but is at the same time so closely fitted within the groove as to prevent oil under ordinary conditions from passing between the snap ring and the spacer sleeve 8. A lubricant, preferably oil, is supplied to the bearings through a central passage 16 in the spindle 3. A radial port 16a in the spindle leads to an annular space 17 in the center spacing sleeve 6 and ports 18 lead from said annular space 7 to the chamber within the hub between the center spacer sleeve and the inner face of the hub. The chamber within the hub is provided with a quantity of liquid sufficient to provide an oil line, indicated in Figures 3 and 4. This oil line is the surface of the oil bath when the wheel is stationary. The oil line is normally maintained at a level so that as the wheel rotates the roller bearings 10a will dip into the bath and thus the bearings are lubricated. The level of the oil bath is also so disposed that the running fit between the snap ring and the groove in the spacer sleeve is above the oil level when the wheel is stationary and this prevents any leakage of the oil through this running fit. The snap ring is closely spaced relative to the walls so as to really serve as an oil seal at all times, preventing oil from escaping. The snap ring is divided and the ends 19, 19 are slightly spaced from each other and preferably beveled, as shown at 20a, 20a in Figure 5. This is the position of the ends after the snap ring has been forced into the flange 13 of the oil retainer 12. When in position, the space between the ends of the ring is only sufficiently large to permit breathing or the necessary relief to avoid undue pressure within the chamber of the wheel hub. The snap ring, as above noted, makes frictional contact with the flange 13 of the oil retainer 12 and will therefore center itself in the groove in the spacer sleeve. When the oil is maintained at the level indicated in the drawings, it will pass through the bearings so that the oil retaining chamber extends all the way to the oil retainer 12 at the ends of the hub so that the rollers or moving parts of the bearings dip into the oil bath at each rotation of the wheel.

While the drawings show bearings provided with rollers, it is understood that balls may be used in place of the rollers. The improvement is not in the bearing per se, but in the arrangement and construction of parts which provides a lubricating system for an axleless truck wherein the quantity of lubricant may be retained within the hub of each weel for lubricating the bearings for the wheel.

It is obvious that many changes in the details of construction may be made without departing from the spirit of the invention as set forth in the appended claim.

I claim:

A wheel mounting for trucks having a spindle supported by spaced side frames, a wheel having a hub mounted on bearings carried by said spindle, spacer sleeves for positioning the bearings on the spindle, an annular oil retainer mounted in the hub at each end thereof, each retainer having a wall making a close running fit with the side frame, said retainer wall having an outer cylindrical flange projecting inwardly and frictionally engaging said hub for rotation therewith, said retainer wall having an inner cylindrical flange projecting inwardly into the hub, a split metal ring expanded into engagement with said inner flange and rotatable therewith, said ring being dimensioned so as to loosely fit in a groove of the associated outer spacer sleeve and form an oil seal for retaining an oil bath within the hub, said ring being free to move longitudinally of the spindle on said inner flange and center itself in said groove.

HENRY FORT FLOWERS.

REFERENCES CITED

The following references are of record in the file of this patent:

UNITED STATES PATENTS

| Number | Name | Date |
|---|---|---|
| 2,076,218 | Alden | Apr. 6, 1937 |
| 2,078,915 | Flowers | Apr. 27, 1937 |
| 2,427,831 | Bennett et al. | Sept. 23, 1947 |